(12) United States Patent
Buxton et al.

(10) Patent No.: US 6,245,842 B1
(45) Date of Patent: Jun. 12, 2001

(54) FLAME-RETARDANT COATING AND BUILDING PRODUCT

(75) Inventors: Richard L. Buxton; Erik M. Parker, both of Boise, ID (US)

(73) Assignee: Trus Joist MacMillan a Limited Partnership, Boise, ID (US)

( * ) Notice: Subject to any disclaimer, the term of this patent is extended or adjusted under 35 U.S.C. 154(b) by 0 days.

(21) Appl. No.: 09/518,427

(22) Filed: Mar. 3, 2000

(51) Int. Cl.[7] .............................. C08K 5/34; C08K 3/10; C08K 3/16

(52) U.S. Cl. .................. 524/101; 524/411; 524/423; 524/425; 524/434; 524/495; 524/399; 524/443; 524/464; 428/423.1; 252/609

(58) Field of Search .................. 252/609; 428/423.1; 524/101, 411, 423, 425, 434, 495, 399, 443, 464

(56) References Cited

U.S. PATENT DOCUMENTS

| | | |
|---|---|---|
| 4,698,369 | 10/1987 | Bell . |
| 4,742,087 | 5/1988 | Kluth et al. . |
| 4,774,268 | 9/1988 | Marx et al. . |
| 4,795,776 | 1/1989 | Milner . |
| 4,857,364 | 8/1989 | von Bonin . |
| 5,124,367 | 6/1992 | Barker et al. . |
| 5,186,388 | 2/1993 | Chapman et al. . |
| 5,192,811 | 3/1993 | Heitmann et al. . |
| 5,262,454 | 11/1993 | Leroux et al. . |
| 5,387,655 | 2/1995 | Aslin . |
| 5,569,682 | 10/1996 | Walmsley . |
| 5,591,791 | 1/1997 | Deogon . |
| 5,594,046 | 1/1997 | Joachimi . |
| 5,739,173 | 4/1998 | Lutter et al. . |
| 5,741,827 | 4/1998 | Chakrabarti et al. . |
| 5,942,561 | 8/1999 | Okisaki et al. . |
| 5,968,669 | 10/1999 | Liu et al. . |
| 6,000,189 | 12/1999 | Breuer et al. . |

*Primary Examiner*—Kriellion Sanders
(74) *Attorney, Agent, or Firm*—Kolisch Hartwell Dickinson McCormack & Heuser (57) ABSTRACT

A flame-intumescent coating is provided for a wood-based building product, the coating being adapted to expand to form an expanded coating when exposed to heat from a fire. The coating comprises a polymeric binder, at least one blowing agent dispersed in the binder, and at least one intumescent compound dispersed in the binder. The blowing agent and intumescent compound are adapted to expand the coating when the coating is exposed to heat from a fire. The polymeric binder is formed from a mixture including castor oil and an isocyanate, wherein the castor oil is present in the mixture in a quantity of 9–36% of the total weight of the coating. A flame-retardant building product is also provided.

81 Claims, 2 Drawing Sheets

FLAME-RETARDANT COATING AND BUILDING PRODUCT

BACKGROUND OF THE INVENTION

The present invention relates to a flame-retardant intumescent coating for wood-based building products. More particularly, the invention provides a fast-curing flame-retardant coating that expands when exposed to fire to form a protective insulating layer over a wood-based substrate, and a wood-based product coated with the coating.

Flame-retardant treatments have been used on wood-based building products for many years to enhance the safety of structures built with the products. Several different types of flame-retardant treatments are known. For example, one type of treatment involves impregnating the building products with flame-retardant chemicals. Another type involves coating the surface of the building products with a flame-retardant coating, and another type involves bonding flame-retardant laminates to the surfaces of the building products. Each of these treatments has several different flame-retardant functions. First, the treatments may exclude oxygen from the underlying wood, reducing the tendency of the wood to burn. Thus, a structure built with treated materials may suffer less damage in a fire than a structure built with untreated materials. Second, the treatments may reduce the amount of smoke produced in a fire, and possibly lower the danger of smoke inhalation by persons in a burning structure. Third, the treatments may reduce the overall thermal flux of a fire, and thus may reduce the tendency of a fire to spread.

Early flame-retardant treatments often involved impregnating the building product with a flame-retardant chemical, such as monoammonium phosphate or phosphoric acid. These chemicals react with the wood in the presence of heat so that the wood forms a char layer. The char provides a protective layer that insulates the underlying wood and prevents oxygen from reaching the underlying wood. However, these treatments have several drawbacks. First, the formation of the char weakens the wood. Second, the phosphates may leach out of the wood with time, reducing the effectiveness of the treatments. Third, these treatments have been known to cause premature thermal degradation of the wood in the presence of heat from a source such as solar radiation, which may possibly lead to the failure of a structure made from the treated wood.

To avoid the loss of strength associated with the char formation in chemically impregnated flame-retardant building products, some building products are coated with a flame-retardant intumescent, or expandable, coating. In these systems, the coating itself forms a char, so that char formation does not damage the strength of the building product. These coatings generally consist of an inorganic acid such as phosphoric acid, an organic material that may be dehydrated by the acid to form a char, a blowing agent to evolve a gas in the presence of heat to expand the char, and a binder to hold the char together and to bind the char to the underlying wood-based material. The expanded coating insulates the underlying material and prevents oxygen from reaching the underlying wood. These coatings are an improvement over the wood-impregnating treatments because the char is not formed from the wood itself. However, these coatings also have some drawbacks. First, the phosphates in the coatings are expensive, and significantly increase the cost of building materials treated with the coatings. Second, the char layer may be too thin to insulate the underlying wood well enough to prevent damage. Third, many of these coatings have insufficient expansive strength to expand when covered by paint or other wood treatments. Fourth, many of these coatings must be applied as aqueous emulsions. These emulsions may not be suitable for production line use, as the dry times of the coatings may be quite slow.

Another type of intumescent coating uses a graphite-based substance known as expandable graphite to protect the underlying wood-based material from fire. Expandable graphite is produced by intercalating a material that decomposes into a gas when heated into the crystal lattice of ordinary graphite. When the coating is heated to the decomposition temperature of the intercalate, the gasses produced push apart the layers of the graphite, expanding the coating up to 100 times the original thickness and producing an insulating layer over the wood-based material.

Coatings with expandable graphite typically expand to a greater degree than other intumescent coatings, and thus provide superior insulation to the underlying material. However, known expandable graphite coatings also have drawbacks. First, these coatings often exhibit the "popcorn effect", where the expansion of the grains of the graphite cause the grains to pop off the surface of the underlying material. Second, the expanded graphite is weak and brittle, and may be blown off of the underlying material by the turbulent winds produced in a fire. A binder is typically used to prevent the popcorn effect and to hold the expanded coating together. However, many binders are flammable, and thus may counteract the flame-retardant properties of the coating.

One example of a flame-retardant coating with expandable graphite is disclosed in PCT Publication No. WO 91/11498. The coating comprises expandable graphite, one or more binders and one or more of a range of intumescent char-forming materials, defined in the publication as a mixture including phosphates or sulfates and a carbonific material, such as a starch or a polyhydric alcohol. However, the phosphates and sulfates used in these coatings are relatively expensive, and may increase the price of building materials treated with these coatings. Another example of an expandable graphite coating is disclosed in U.S. Pat. No. 5,968,669. The coating comprises expandable graphite, miscellaneous fillers, a polymeric binder and a wetting agent. Because this coating is applied as a water-based solution, the dry times of the coating may be too slow for production line use. Thus, there remains a need for an inexpensive, strongly adhering intumescent coating for wood-based building products that may be applied at a high process rate.

SUMMARY OF THE INVENTION

One aspect of the present invention provides a flame-retardant intumescent coating for a wood-based building product, the coating being adapted to expand to form an expanded coating when exposed to heat from a fire. The coating comprises a polymeric binder, at least one blowing agent dispersed in the binder, and at least one intumescent compound dispersed in the binder. The blowing agent and intumescent compound are adapted to expand the coating when the coating is exposed to heat from a fire. The polymeric binder is formed from a mixture including castor oil and an isocyanate, wherein the castor oil is present in the mixture in a quantity of 9–36% of the total weight of the coating.

Another aspect of the present invention provides a fast-curing composition for use as a flame-retardant intumescent coating for wood-based building products. The composition comprises a mixture of a dry component and a curable component. The dry component includes expandable graphite, vermiculite and at least one blowing agent, and comprises between 35% and 70% of the mixture by weight. The curable component includes castor oil and at least one isocyanate.

Yet another aspect of the present invention provides a flame-retardant building product. The building product comprises a member formed from a wood-based material and including at least one surface. At least one layer of an intumescent flame-retardant coating is disposed on at least one of the surfaces of the member. The intumescent coating includes a polymeric binder, at least one blowing agent, and at least one intumescent compound, wherein the polymeric binder is formed from a mixture including castor oil and at least one isocyanate, and wherein the castor oil is present in the mixture in a concentration of 9–36% of the total coating by weight.

DETAILED DESCRIPTION OF THE INVENTION

The present invention provides an inexpensive flame-retardant intumescent coating for wood-based building products that may be applied at high process rates. The coating may be sprayed onto a wood-based substrate without the use of any solvents, so there is no need to dry the coating after application. Furthermore, the coating strongly adheres to the substrate, and resists popping off the substrate when the coating expands. Additionally, the expanded coating resists being blown off the substrate by the turbulent winds created in a fire. Generally, the coating comprises a polymeric binder, an intumescent material, and a blowing agent. The polymeric binder holds the coating together, binds the coating to the wood-based substrate, and protects the coating from damage caused by weather and handling. The intumescent material expands when exposed to heat, expanding the coating and providing insulation for the wood-based substrate. The blowing agent evaporates, sublimes, or otherwise evolves a gas when exposed to a fire to contribute to the expansion of the coating. Other additives may also be added to the coating to give the coating any desired properties.

The polymeric binder has several functions in the present coating. First, the binder provides a matrix in which the other components of the coating are dispersed. Second, the binder binds the coating to the underlying substrate. Third, the binder contributes to the insulating char layer formed by the expansion of the coating. Generally, the binder is a polyurethane-based compound formed from a mixture including castor oil and an isocyanate. The binder may be somewhat flammable, but the coating also contains a high concentration of non-flammable solids, which are described in more detail below. The concentration of solids reduces the flammability of the coating, so that the binder does not burn, but merely chars, when exposed to flame. The resulting char may be expanded by the blowing agent, and thus may contribute to the overall insulating properties of the expanded coating.

The use of castor oil to form the polyurethane-based binder offers many benefits over the use of other polyols. First, castor oil is much less expensive than other commonly used polyols. Second, the binder has some thermoplastic characteristics at the temperatures commonly experienced in fires. For example, the binder softens somewhat when exposed to fire so that the intumescent compound and blowing agent may expand the coating without fracturing the coating. Thus, it does not melt off the wood, yet also does not become so brittle that it fractures and exposes the underlying substrate. Third, the binder formed from the castor oil is tough, and resists damage caused by handling and weathering. Finally, the binder is an excellent adhesive, and bonds well to wood-based materials. The amount of castor oil used to form a particular coating may be varied depending upon the physical properties desired in the coating. For example, if a coating with stronger adhesive characteristics is desired, more castor oil, along with a proportionate amount of isocyanate, may be used to produce more binder. Conversely, less castor oil may be used, along with less isocyanate, to reduce the flammability of the coating. Preferably, the castor oil is added to the mixture in a quantity of 9–36% by weight of the total weight of the coating.

The physical properties of the polymeric binder may be adjusted by varying the relative quantities of the isocyanate and the castor oil in the mixture from which the binder is formed. The ratio of the isocyanate to the castor oil may be described by the NCO index of the mixture. The NCO index quantifies the number of isocyanate groups relative to the number of alcohol groups in a particular mixture. For example, if the NCO index of a mixture is 100, the ratio of isocyanate groups to alcohol groups is 1:1. Such a mixture would form an essentially uniform polyurethane complex, with relatively little unreacted isocyanate or castor oil left over. On the other hand, if the NCO index of a mixture is greater than 100, the mixture will have an excess of isocyanate groups, and a binder formed from this mixture will have unreacted isocyanate remaining after the polymerization is complete. In one embodiment of the invention, an isocyanurate catalyst may be added to a mixture with excess isocyanate to form isocyanurate compounds in the binder. Isocyanurates provide better heat resistance to the binder, and help the binder form a better char. The greater the NCO index of the mixture, the more isocyanurate may be formed in a binder created from the mixture. Preferably, the binder of the present invention is formed from a mixture with an NCO index of between 100 and 450. More preferably, the NCO index is between 150 and 170. Any suitable amount of isocyanurate catalyst may be added to the mixture. Preferably, the isocyanurate catalyst is added to the mixture in a quantity of 0–2% by weight of the total weight of the coating, though amounts outside this range may also be used. Likewise, any suitable isocyanurate catalyst may be used. A preferred isocyanurate catalyst is dimethylaminopropylhexahydrotriazine, available under the trade name NIAX® C-41 from the Witco Corporation.

Many different isocyanates may be used for the binder of the present invention. Generally, the isocyanate should have two or more isocyanate groups so that a polyurethane may be formed from the mixture. Examples of suitable isocyanates include aromatic isocyanates such as diphenylmethane-4,4'-diisocyanate, meta-toluene diisocyanate, naphthalene diisocyanate, and para-phenylene diisocyanate, and alipathic isocyanates such as hexamethylene diisocyanate, isophorone diisocyanate, trimethylhexamethlyene diisocyanate, and 4,4-dicyclohexyl diisocyanate. A more UV-resistant coating may be formed from the alipathic isocyanates, but these compounds are more expensive and may lead to longer cure times. Thus, aromatic isocyanates are preferred isocyanates, and diphenylmethane-4,4'-diisocyanate is a particularly preferred isocyanate. The weight percentage of the isocyanate used in the mixture may vary depending upon the molecular weight of the isocyanate and the desired NCO index of the mixture. Generally, the isocyanate is added to the mixture in a quantity of 13–21% of the total weight of the coating, but amounts either greater or lesser than this may also be used.

The physical properties of the coating may be further modified by the addition of a chain-extender or cross-linking agent to vary the hardness of the binder. Suitable chain-extenders include diols such as ethylene glycol, diethylene glycol, hexane diol and 1,4 butane diol. Similarly, suitable cross-linking agents include polyols with three or more hydroxyl functional groups and an OH number of 150 or higher. One example of a suitable polyol having four hydroxyl groups is hydroxyl terminated poly(oxyalkylene) polyol, a polyether polyol available under the trade name MULTRANOL® 9181 by the Bayer Corporation. Similarly, some amines may also be used as crosslinking and chain-extending agents, though they may react at a faster rate than the polyols. Examples of suitable amines include ethylene diamine, and such aromatic tri-functional amines as ETHACURE® 100 and ETHACURE® 300, available from Albermarle, Inc. The cross-linking and chain-extending agents are typically added to the mixture in a quantity of 0–5% by weight of the total weight of the coating, although an amount greater than this may be added without departing from the scope of the present invention.

Without any additives, the binder of the present invention cures sufficiently to be tack-free in a matter of minutes. However, this time can be shortened to any desired time, down to a few seconds, with the addition of a suitable accelerator. An example of a suitable accelerator is dibutyl-tin dilaurate, available under the trade name FASCAT® 4202 from Elf Atochem. Typically, the accelerator is added to the mixture in a quantity of 0–2% by weight of the total weight of the coating, though percentages outside this range may also be used.

The coating of the present invention has at least two mechanisms for expansion. First, the coating contains an intumescent compound that expands when exposed to heat. Second, the coating contains a blowing agent that may evaporate, sublime, or otherwise evolve a gas to expand the coating further. Each of these components performs several flame-retardant functions. For example, the expansion of the intumescent compound when exposed to flame performs at least four functions. First, the expanded intumescent compound helps to form an insulating layer to protect the substrate. Second, the expanded compound helps to provide a physical barrier preventing oxygen from reaching the substrate. Third, the intumescent compound absorbs energy as it expands, removing energy from the surface of the substrate. Fourth, the compound reflects heat away from the substrate. Though any suitable intumescent compound may be used in the coating, expandable graphite is a preferred intumescent compound. Expandable graphite is inexpensive, and available in a range of different expansion temperatures. Expandable graphite also retains the desirable heat-resistant characteristics of solid graphite, and expands with sufficient force to be used under rigidized systems, such as beneath cured resins. Preferred expandable graphites are those that start to expand at lower temperatures, such as between 160–180 degrees Celsius. In the preferred embodiment, expandable graphite is added to the coating in a quantity of 6–30% of the coating by weight, although greater or lesser amounts may also be used.

The blowing agent provides a second mechanism for the expansion of the coating of the present invention. Suitable blowing agents provide several different flame-retardant characteristics to the coating. First, the blowing agent absorbs energy when it sublimes, evaporates, thermally decomposes, or otherwise evolves a gas, removing energy from the surface of the substrate to cool the substrate. Second, the blowing agent helps to expand the binder to increase the thickness of the coating, thus enhancing the insulating properties of the coating. Third, preferred blowing agents release non-combustible gasses when heated, thus diluting the concentrations of combustible gasses that are produced when wood burns and the concentration of oxygen in the atmosphere adjacent the substrate. Examples of preferred blowing agents include melamine, melamine derivatives, alumina trihydrate, dicyandiamide, and urea. Melamine is a particularly preferred blowing agent, as it sublimes around 354 degrees Celsius and produces ammonia, a non-flammable gas, upon decomposition. Preferably, the blowing agent is added to the coating in a quantity of 6–30% of the weight of the coating, though greater or lesser amounts may also be used.

In addition to the polymeric binder, the intumescent compound and the blowing agent, various other components may be added to the coating of the present invention to give the coating desired physical characteristics. For example, a non-combustible insulating filler may be added to the coating. The use of a filler may reduce the price of the coating, and may lower the tendency of the polyurethane binder to burn, promoting the binder to form a char rather than to burn when exposed to fire. These fillers also may absorb some of the toxic and flammable gases produced in a fire. One example of a suitable filler is vermiculite ore. Vermiculite ore is non-flammable, and may be added to lower the flammability of the polyurethane-based binder, to insulate the substrate and to reflect heat. Furthermore, the vermiculite ore is an intumescent compound, and expands at a higher temperature range than graphite. Thus, it may be used to remove energy from the substrate to cool the substrate at higher temperatures. Other fillers that may be added to the coating include calcium carbonate, gypsum, anhydrous sodium sulfate, glass microspheres and perlite to lower the cost of the coating and to reduce the flammability of the binder, and alumina trihydrate to release water upon heating. The fillers generally are added to the coating in a quantity of 0–45% of the coating by weight. However, greater quantities may also be used. In a particularly preferred embodiment, the coating includes 6–30% vermiculite ore by weight.

The coating of the present invention may also contain a fibrous filler or other structural reinforcing additive. The use of a structural reinforcing additive may reduce the tendency of the graphite grains to pop off the substrate during expansion, and may also improve the resistance of the expanded coating to the winds produced in a fire. Preferred structural reinforcing additives are flame-resistant and chemically stable at the elevated temperatures encountered in a fire. Examples of suitable reinforcing additives include mineral wool fiber, wollastonite, and glass fibers such as PMF® glass fiber, available from Sloss Industries. The reinforcing additive may be added in any desired amount, provided that the solids content of the coating does not become so high as to reduce the effectiveness of the binder. Preferred amounts of reinforcing additive are between 0–5% of the weight of the coating, though greater quantities may also be used.

Additional flame-retardant components may be added to the coating to enhance the flame-retardant properties of the coating. For example, a halogenated flame retardant may be added to reduce flame spread and smoke production when the coating is exposed to fire. Preferred halogenated flame retardants prevent oxygen from reacting with combustible gasses that evolve from the heated substrate, and react with free radicals to slow free radical combustion processes. Examples of suitable halogenated flame-retardant compounds include chlorinated paraffin, decabromodipheyloxide, available from the Albermarle Corporation under the trade name SAYTE® 102E, and ethylene bis-tetrabromophthalimide, also available from the Albermarle Corporation under the trade name SAYTEX® BT-93. The halogenated flame-retardant compound is typically added to the coating in a quantity of 0–5% of the coating by weight, although greater amounts may also be used. Often, it is desirable to use the halogenated flame-retardant compound in combination with a synergist that increases the overall flame-retardant properties of the halogenated compound. Suitable synergists include zinc hydroxy stannate and antimony trioxide. Typically, these synergists are added to the coating in a quantity of 1 part per 2–3 parts halogenated flame retardant by weight, though more or less may also be used.

The coating of the present invention may also include a surfactant to increase the miscibility of the various components of the coating, and to improve the ability of the coating to wet a substrate surface. Many different surfactants may be used, including fluorosurfactants, silicone and hydrocarbon surfactants. Examples of fluorosurfactants include FLUORAD® FC-740 and FLUORAD® FC-430 from 3M, which are mixtures of fluoroaliphatic polymeric esters and residual organic fluorochemicals dispersed in petroleum solvents such as toluene. Examples of suitable silicone surfactants include NIAX® silicone L-1000 and NIAX® silicone L-5340 from the Witco Corp., both of which contain polyalkyleneoxidemethylsiloxane copolymers and polyalkylene oxide in different ratios. Other suitable silicone surfactants include those sold by Air Products under the trade name DABCO®, such as DABCO® DC193. Examples of suitable hydrocarbon surfactants include propylene carbonate, ethylene glycol monostearate, and propylene glycol monolaurate. The surfactant is typically added to the coating in a quantity of 0–2% of the coating by weight, though greater quantities may also be used.

One advantage of the coating of the present invention is that it may be applied to wood-based substrates at a high process rate. Because the coating may be applied without the use of a solvent, no time needs to be allotted to evaporating the solvents after application. The coating may be applied by any suitable method, but is particularly suited to be applied by spraying, using the system disclosed in U.S. Pat. No. 5,186,388 to Chapman et al., which is hereby incorporated by reference. The spraying system described in Chapman et al. mixes a dry component of a composite material with a curable liquid resin by impinging a stream of the dry component with a stream of the resin as both are sprayed from separate nozzles toward a substrate. This system allows a high concentration of solid components to be mixed into a rapidly curing polymer matrix without the use of a solvent, and is particularly suited for applying a coating over a large area.

Before the coating is sprayed onto a substrate, the solid compounds in the coating are mixed together to form a dry component. The dry component generally comprises the intumescent compound, the blowing agent, any fillers, and other solid components, such as some flame retardants and some surfactants. The intumescent compound, preferably expandable graphite, is typically added to the dry component in a quantity of 12–60% of the dry component by weight. The blowing agent is also generally added to the dry component in a quantity of 12–60% by weight. Other fillers, such as vermiculite or any others described above, may be added to the dry component in an individual or combined quantity of 0–60% of the dry component by weight. In a preferred embodiment, vermiculite is added to the dry component in a quantity of 10–60% of the dry component by weight. It should be noted that these ranges are preferred ranges, and amounts outside these ranges may also be used.

Because the binder of the present invention hardens rapidly, the castor oil and the isocyanate from which the binder is formed should be mixed relatively close to the time the dry components are added to the binder mixture. In the preferred embodiment, the castor oil and the isocyanate are kept in separate feeder containers prior to spraying the coating. Any liquid compounds to be used in the coating other than the castor oil and the isocyanate are then mixed into either the castor oil or the isocyanate. Examples of these compounds include other polyols, isocyanurate catalysts, accelerators, and possibly some halogenated flame retardants and surfactants. Each of these compounds is mixed into the chemical with which it is the least chemically reactive. For example, the isocyanurate catalyst is mixed with the castor oil so that it does not react with the isocyanate prior to spraying the coating. Similarly, the other polyols are also added to the castor oil to prevent premature polymerization with the isocyanate.

The castor oil and isocyanate are mixed together to form a binder mixture, also referred to as a curable component, immediately before the dry component and the curable component are mixed. In the preferred embodiment, the castor oil and the isocyanate are sprayed together in separate streams and mixed by impingement. The castor oil and the isocyanate are each pumped from the feeder containers to a mixing area in the spray system by positive displacement pumps, and each have a line pressure of approximately 1500–2000 psi. The pumping rates may be adjusted to mix any desired quantities of castor oil and isocyanate, and are typically chosen to give the mixture a desired NCO index. In a preferred embodiment using diphenylmethane-4,4'-diisocyanate as the isocyanate, the pumping rates are adjusted so that the castor oil comprises 18–72% of the curable component by weight, and more preferably 32–68% of the curable component. Similarly, the isocyanate comprises 26–65% of the curable component by weight, and more preferably 26–42% of the curable component, though amounts outside these ranges may also be used for either compound. In general, the quantities of castor oil and isocyanate mixed preferably results in a mixture with an NCO index of between 100 and 450, and more preferably between 150 and 170. The NCO index may be further adjusted by adding an additional polyol to the castor oil with more or fewer alcohol groups than the castor oil. These polyols are typically added to the curable component in a quantity of 0–4% by weight. An isocyanurate catalyst may also be added to convert the excess isocyanates to isocyanurates to harden and improve the heat resistance of the resulting binder. Typically, the isocyanurate catalyst would be added to the curable component in a quantity of 0–2% of the curable component by weight.

Just downstream from where the curable component is mixed, the curable component is forced through a nozzle. A stream of the dry component fed through a separate nozzle is injected into the stream of the curable component to mix the dry and curable components, and the combined stream is directed onto the substrate. The ratio of the dry component to the curable component may vary between 35–70%. In the preferred embodiment, the ratio of the dry components to the wet components is approximately 50%. Once deposited on the substrate, the coating cures rapidly, and other processes may be performed on the substrate within minutes of applying the coating. Furthermore, the time the coating takes to cure to a tack-free state may be shortened to as low as a few seconds in a highly controllable fashion through the use of an accelerator. The accelerator is typically added to the curable component in a quantity of 0–4% of the curable component by weight.

The thickness of the layer of coating may be controlled by varying the rate of movement of the spray nozzle along the substrate, or by varying the rate of spraying. In the preferred embodiment, a single layer of coating is approximately 0.003–0.25 inch thick, and more preferably between 0.005 and 0.05 inch thick. If desired, more than one layer of coating may be deposited to make the overall coating as thick as desired. For example, in the preferred embodiment, a plurality of layers of coating are applied to give the final coating an overall thickness of 0.01–0.5 inch, and more preferably 0.030–0.060 inch. Furthermore, the composition of each layer may vary to adjust the physical properties of the coating. In one embodiment of the invention, a layer of alumina trihydrate or another filler is deposited on top of the outer layer of coating. The layer of alumina trihydrate may be used as a temporary blocking agent to protect downstream processing machinery from contamination with any uncured coating, and to provide an additional insulating and protective layer to the substrate. Also, the alumina trihydrate is a water-evolving compound that releases water when exposed to heat to help cool the coating and substrate.

Figure 1:
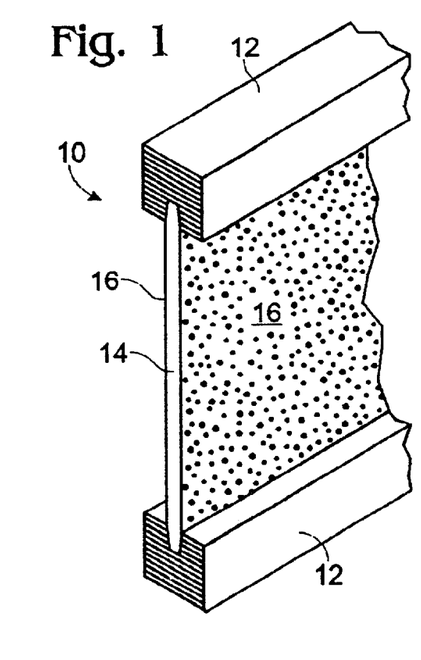
FIG. 1 is a perspective view of a wood-based I-joist according to one embodiment of the present invention.
Figure 2:
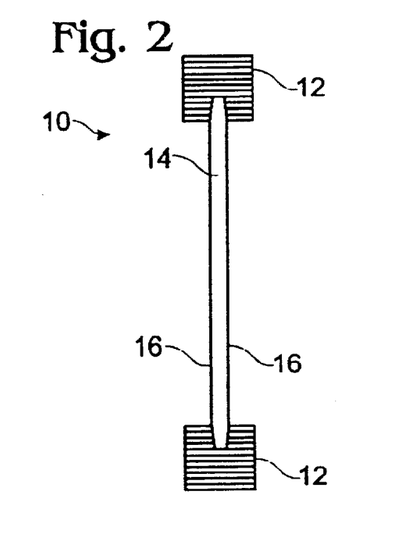
FIG. 2 is an end view of the embodiment of FIG. 1.
Figure 3:
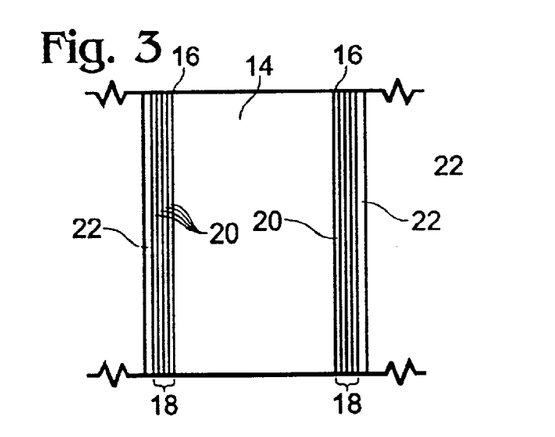
FIG. 3 is an enlarged end view of a segment of the web of the embodiment of FIG. 1, before the coating has been expanded.

Another aspect of the present invention provides a flame-retardant building product. Generally, the building product comprises a member formed from a wood-based material, and at least one layer of the flame-retardant coating of the present invention coated on at least one surface of the member. One embodiment of this aspect of the invention is shown generally at 10 in FIGS. 1–2 as a flame-retardant wood-based I-joist. I-joist 10 includes opposing flanges 12, and a web 14 with opposing sides 16. Flanges 12 and web 14 are made from any of several wood-based materials, including ordinary lumber, oriented strand board, laminated veneer lumber, laminated strand lumber and parallel strand lumber. Referring now to FIG. 3, each opposing side 16 of web 14 includes a coating 18 formed from a plurality of layers 20 of the flame-retardant composition described above. The thickness of layers 20 are somewhat exaggerated in FIG. 3 to illustrate the structure of coating 18. As shown in FIG. 3, I-joist 10 has four layers 20 of the flame-retardant composition on each side 16 of web 14, but either more or fewer layers may be used. In the preferred embodiment, each layer 20 of the flame-retardant composition is approximately 0.003 to 0.25 inch thick, giving coating 18 a total thickness of approximately 0.012–1 inch, depending upon the thickness of each individual layer. Each side 16 of web 14 also has an outer layer 22 of a non-flammable filler formed on the outermost layer 20 of coating 18. Layers 22 of the non-flammable filler may be used as a temporary blocking agent to protect downstream processing machinery from contamination with any uncured coating, and may also provide an additional insulating and protective layer to the substrate. The filler used for layers 22 may be any suitable non-flammable material, including those described earlier. In the preferred embodiment, layers 22 are composed of alumina trihydrate. Layers 22 may be any desired thickness, but are typically thicker than layers 20 of coating 18, as the fillers used for layers 22 may be quite inexpensive, and thicker layers 22 may be more effective as insulating layers.

Figure 4:
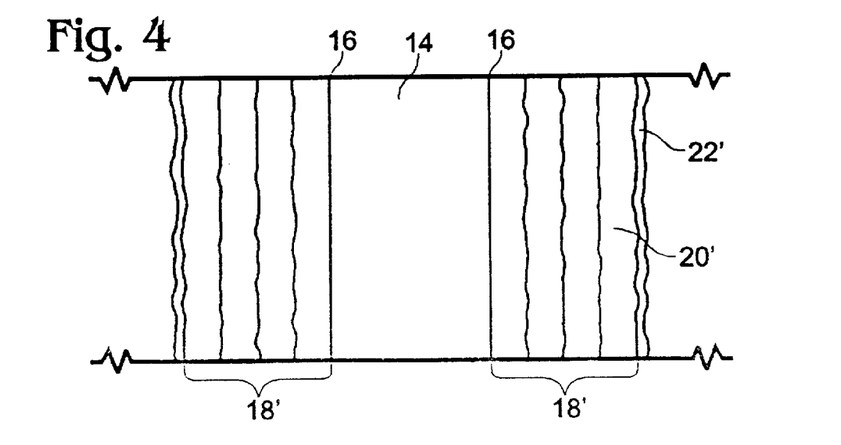
FIG. 4 is an enlarged end view of a segment of the web of the embodiment of FIG. 1, after the coating has been expanded.

FIG. 4 illustrates flame-retardant web 14 after it has been exposed to a fire. Each layer 20 of coating 18 has been expanded to form an expanded layer 20', thus forming an overall expanded coating 18'. Typically, each expanded layer 20' is about 0.25 inch thick, giving expanded coating 18' an overall thickness of approximately 1 inch. However, each layer 20 may expand either more or less than this, depending upon the concentrations of the expandable graphite and the blowing agent present in each layer, and upon the particular expandable graphite composition and blowing agent used. Insulating filler layer 22 may also undergo physical or chemical change in a fire to form a post-expansion insulating filler layer 22'. In the preferred embodiment, the alumina trihydrate layers 22 release a non-combustible gas due to the fire, resulting in the formation of anhydrous aluminum oxide in layer 22'. Both the expansion of coating 18 and the dehydration of layers 20 protect web 14 from the fire, and web 14 remains essentially undamaged from the exposure of I-joist 10 to the fire. While only web 14 is shown coated with the flame-retardant coating in the illustrated embodiment, any other part of I-joist 10 may be coated with the coating without departing from the scope of the present invention. Furthermore, while an I-joist is used as an illustrated embodiment of the building product of the present invention, any other wood based member besides an I-joist may also be used in the building product of the present invention.

Figure 5:
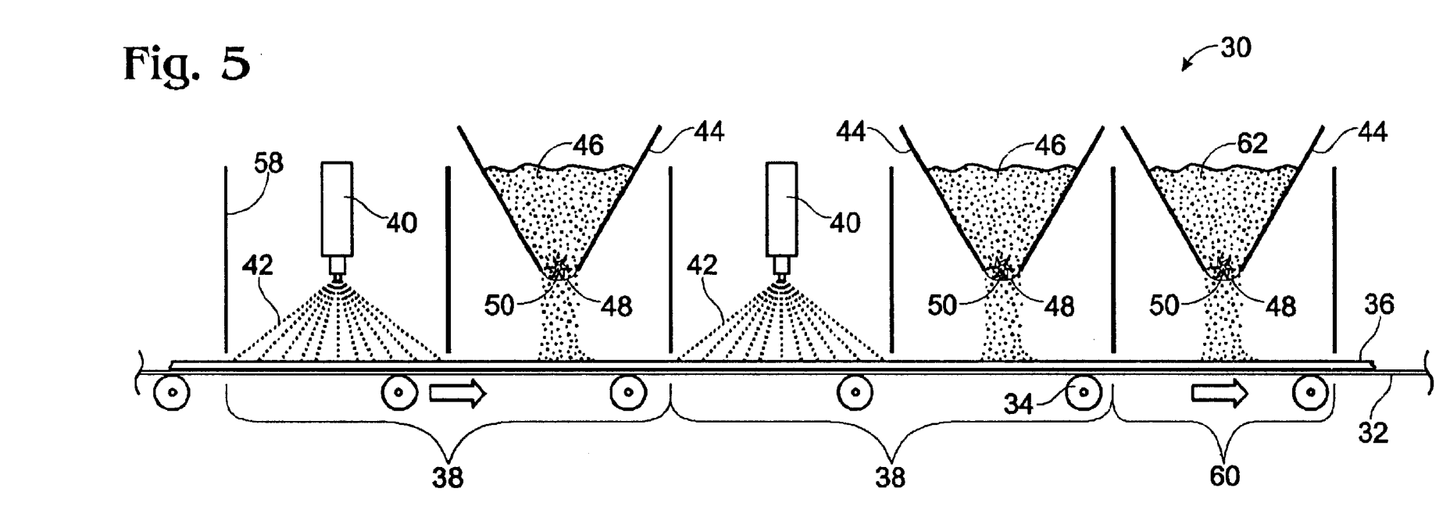
FIG. 5 is a schematic representation of an alternative embodiment of the method of applying the coating.
Figure 6:
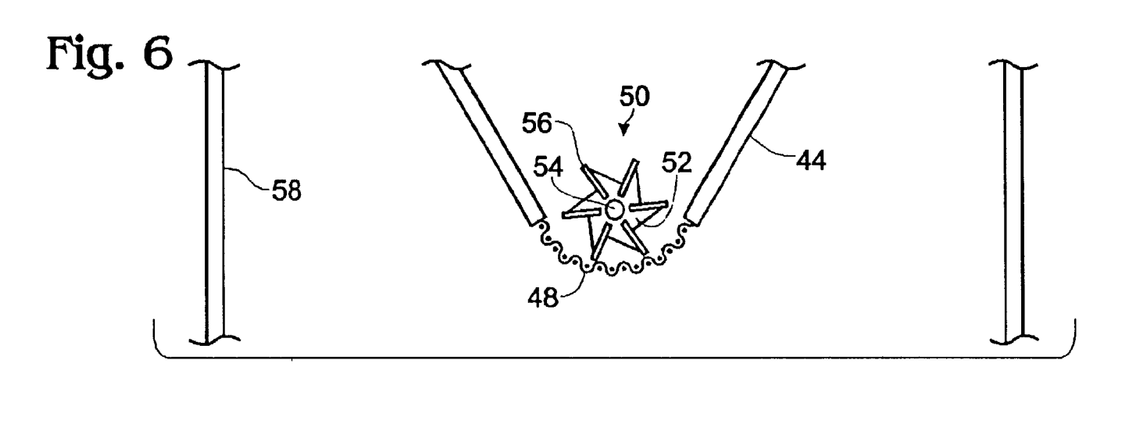
FIG. 6 is a side elevation view of an agitator used in association with the method depicted in FIG. 5.

The coating of the present invention may be applied in other manners besides spraying. For example, one method involves applying alternating layers of the uncured polymer binder and of the dry components to the wood-based member. This may be accomplished by any suitable method, such as by applying each layer by hand. In the preferred embodiment, however, the alternating layers are applied by moving the wood-based member in a continuous manner beneath a stationary array of coating equipment that alternately coat the member with binder and dry components. FIG. 5 shows generally at 30 a system that may be used to apply the coating in this manner. System 30 includes a conveyer belt 32 driven by wheels 34 for moving a wood-based member 36 along the system. As shown in FIG. 5, belt 32 moves in a left-to-right direction. System 30 also includes one or more coating application stations 38. Each coating application station 38 includes a binder application apparatus 40 for directing a spray 42 of liquid components onto wood-based member 36, and a dry component application apparatus 44 for spreading a mixture 46 of dry components onto the layer of the curable component. Binder application apparatus 40 may be any suitable apparatus for spraying a substantially uniform layer of binder onto wood-based member 36. In the preferred embodiment, binder application apparatus 40 is a sprayer that mixes a stream of the castor oil with a stream of the isocyanate by impingement just before spraying the coating. Similarly, dry component application apparatus 44 may be any suitable apparatus that spreads a substantially uniform layer of dry mixture 46 onto wood-based member 36. In the preferred embodiment, dry component application apparatus 44 is a hopper, and includes a sieve 48 to retain larger particles, and an agitator 50 to promote particle movement through sieve 48. As shown in FIG. 6, agitator 50 preferably comprises a wheel 52 driven by an axle 54 attached to a motor (not shown), with ribs 56 extending from wheel 52 to force the movement of the dry material across sieve 48. Each application apparatus may be separated from the upstream and downstream apparatuses by an air baffle 58 to isolate each processing stage.

At each coating application station 38, wood-based member 36 is coated first with uncured binder and then with solid components. As a result, the final overall coating has a layered structure, with one layer of coating deposited at each station. Thus, the four-layer coating shown in FIG. 3 may be produced by passing each side of web 14 through four coating application stations 38. If desired, a final dry coating stage 60 may be included to deposit a layer of a filler 62 on the final dry mixture layer to protect downstream processing equipment from contamination with uncured resin, and to improve the flame-retardant properties of the coating.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application.

We claim:

1. A quick-curing flame-retardant intumescent coating for a wood-based building product, the coating being adapted to expand to form an expanded coating when exposed to heat from a fire, the coating comprising:
   a polymeric binder;
   at least one blowing agent dispersed in the binder, wherein the blowing agent is adapted to expand the coating when the coating is exposed to heat from a fire; and
   at least one intumescent compound dispersed in the binder,
   wherein the polymeric binder is formed from a mixture including castor oil and an isocyanate, and wherein the castor oil is present in the mixture in a quantity of 9–36% of the total weight of the coating.

2. The flame-retardant coating of claim 1, wherein the isocyanate is a diisocyanate.

3. The flame-retardant coating of claim 1, wherein the isocyanate is selected from the group consisting of diphenylmethane-4,4'-diisocyanate, meta-toluene diisocyanate, naphthalene diisocyanate, para-phenylene diisocyanate, hexamethylene diisocyanate, isophorone diisocyanate, trimethylhexamethlyene diisocyanate, and 4,4-dicyclohexyl diisocyanate.

4. The flame-retardant coating of claim 1, wherein the isocyanate is present in the mixture in a quantity of 13–33% of the total weight of the coating.

5. The flame-retardant coating of claim 1, wherein the isocyanate is present in the mixture in a quantity of 13–21% of the total weight of the coating.

6. The flame-retardant coating of claim 1, further comprising an isocyanurate compound disposed in the binder.

7. The flame-retardant coating of claim 6, the mixture having an isocyanate index, wherein isocyanate index of the mixture is between 100 and 450.

8. The flame-retardant coating of claim 7, wherein the mixture includes an isocyanurate catalyst that catalyzes a polymerization of excess isocyanate to form the isocyanurate compound.

9. The flame-retardant coating of claim 8, wherein the isocyanurate catalyst is dimethylaminopropylhexahydrotriazine.

10. The flame-retardant coating of claim 8, wherein the isocyanurate catalyst is mixed into the mixture in a quantity of 0–2% of the total weight of the coating.

11. The flame-retardant coating of claim 7, wherein the isocyanate index is between 150 and 170.

12. The flame-retardant coating of claim 1, wherein the blowing agent is selected from the group consisting of melamine, melamine derivatives, alumina trihydrate, dicyandiamide, and urea.

13. The flame-retardant coating of claim 1, wherein the blowing agent comprises 6–30% of the coating by weight.

14. The flame-retardant coating of claim 1, wherein the intumescent compound is expandable graphite.

15. The flame-retardant coating of claim 14, wherein the expandable graphite begins to expand at a temperature between 160 and 180 degrees Celsius.

16. The flame-retardant coating of claim 1, wherein the intumescent compound comprises 6–30% of the coating by weight.

17. The flame-retardant coating of claim 1, wherein the mixture includes an accelerator to accelerate the formation of the polymeric binder.

18. The flame-retardant coating of claim 17, wherein the accelerator is present in the mixture in a quantity of 0–2% of the total weight of the coating.

19. The flame-retardant coating of claim 17, wherein the accelerator is dibutyltin dilaurate.

20. The flame-retardant coating of claim 1, wherein the mixture includes a crosslinking agent to increase the hardness of the polymeric binder.

21. The flame-retardant coating of claim 20, wherein the crosslinking agent is present in the mixture in a quantity of 0–5% of the total weight of the coating.

22. The flame-retardant coating of claim 20, wherein the crosslinking agent is a polyol.

23. The flame-retardant coating of claim 20, wherein the crosslinking agent is hydroxyl terminated poly(oxyalkylene) polyol.

24. The flame-retardant coating of claim 1, further comprising a non-combustible insulating filler dispersed in the binder to insulate the building product.

25. The flame-retardant coating of claim 24, wherein the insulating filler comprises 0–45% of the coating by weight.

26. The flame-retardant coating of claim 24, wherein the insulating filler is selected from the group consisting of vermiculite ore, expanded perlite, alumina trihydrate, gypsum, calcium carbonate, anhydrous sodium sulfate, and glass microspheres.

27. The flame-retardant coating of claim 24, wherein the insulating filler is vermiculite, and wherein the vermiculite comprises 6–30% of the coating by weight.

28. The flame-retardant coating of claim 1, further comprising a reinforcing additive dispersed in the binder to strengthen the expanded coating.

29. The flame-retardant coating of claim 28, wherein the reinforcing additive comprises 0–5% of the coating by weight.

30. The flame-retardant coating of claim 28, wherein the reinforcing additive is selected from the group consisting of mineral wool fiber, glass fiber and wollastonite.

31. The flame-retardant coating of claim 1, further comprising a halogenated flame retardant dispersed in the coating to reduce flame spread and smoke production when the coating is exposed to fire.

32. The flame-retardant coating of claim 31, wherein the halogenated flame retardant comprises 0–5% of the coating by weight.

33. The flame-retardant coating of claim 31, further comprising a synergist.

34. The flame-retardant coating of claim 33, wherein the synergist is selected from the group consisting of antimony trioxide and zinc hydroxy stannate.

35. The flame-retardant coating of claim 1, further comprising a surfactant to enhance the miscibility of one or more components in the coating.

36. The flame-retardant coating of claim 35, wherein the surfactant comprises 0–2% of the coating by weight.

37. The flame-retardant coating of claim 35, wherein the surfactant is selected from the group consisting of fluorosurfactants, silicone surfactants and hydrocarbon surfactants.

38. A fast-curing composition for use as a flame-retardant intumescent coating for wood-based building products, the composition comprising:
a mixture of a dry component and a curable component, wherein the dry component includes expandable graphite, vermiculite and at least one blowing agent, wherein the curable component includes castor oil at least one isocyanate and an isocyanurate catalyst to form an isocyanurate from excess isocyanate, and wherein the dry component comprises between 35% and 70% of the mixture by weight.

39. The composition of claim 38, wherein the expandable graphite comprises 12–60% of the dry component by weight.

40. The composition of claim 38, wherein the vermiculite comprises 12–60% of the dry component by weight.

41. The composition of claim 38, wherein the blowing agent comprises 12–60% of the dry component by weight.

42. The composition of claim 38, wherein the castor oil comprises 18–72% of the curable component by weight.

43. The composition of claim 38, wherein the castor oil comprises 32–68% of the curable component by weight.

44. The composition of claim 38, wherein the isocyanate comprises 26–65% of the curable component by weight.

45. The composition of claim 38, wherein the isocyanate comprises 26–42% of the curable component by weight.

46. The composition of claim 38, the curable component having an isocyanate index, wherein isocyanate index is between 100 and 450.

47. The composition of claim 46, wherein the curable component includes an isocyanurate catalyst that catalyzes a polymerization of excess isocyanate to form the isocyanurate compound.

48. The flame-retardant coating of claim 46, wherein the isocyanurate catalyst comprises 0–2% of the curable component by weight.

49. A flame-retardant building product, comprising:
a member formed from a wood-based material, the member including at least one surface; and
at least one layer of an intumescent flame-retardant coating disposed on at least one of the surfaces of the member, the intumescent coating including a polymeric binder, at least one blowing agent, and at least one intumescent compound,
wherein the polymeric binder is formed from a mixture including castor oil and at least one isocyanate, and wherein the castor oil is present in the mixture in a concentration of 9–36% of the total coating by weight.

50. The building product of claim 49, wherein the castor oil is present in the mixture in a concentration of 16–34% of the total coating by weight.

51. The building product of claim 49, wherein the member is an I-joist.

52. The building product of claim 51, the I-joist including a web and opposing flanges, the web having opposing surfaces, wherein the layer of the intumescent flame-retardant material is disposed on at least one of the surfaces of the web.

53. The building product of claim 49, wherein the layer of the coating is between 0.003 and 0.25 inch thick.

54. The building product of claim 49, wherein the layer of the coating is between 0.005 and 0.05 inch thick.

55. The building product of claim 49, wherein a plurality of layers of the coating are disposed on at least one of the surfaces of the member.

56. The building product of claim 55, wherein the total thickness of the plurality of layers of the coating is between 0.030 and 0.060 inch thick.

57. The building product of claim 49, further comprising a layer of an insulating material disposed on the layer of coating to insulate the coating when the coating is exposed to fire.

58. The building product of claim 57, wherein the insulating material is a water-evolving material that releases water when exposed to heat.

59. The building product of claim 57, wherein the insulating material is alumina trihydrate.

60. The building product of claim 49, wherein the intumescent flame-retardant coating further comprises 6–30% vermiculite.

61. A method of manufacturing a flame-retardant wood-based structural member, comprising:
selecting a wood-based building product; and
applying a flame-retardant intumescent coating to the product, wherein the coating comprises expandable graphite, at least one blowing agent, and a polymeric binder, and wherein the polymeric binder is formed from a mixture including 9–36% castor oil by weight of the total coating and at least one isocyanate.

62. The method of claim 61, wherein the castor oil is present in the mixture in a quantity of 9–36% of the total weight of the coating.

63. The method of claim 61, wherein the coating includes vermiculite in a quantity of 6–30% of the coating by weight.

64. The method of claim 61, wherein the isocyanate is present in the mixture in a quantity of 13–33% of the total weight of the coating.

65. The method of claim 61, further comprising an isocyanurate compound disposed in the binder.

66. The method of claim 65, the mixture having an isocyanate index, wherein isocyanate index of the mixture is between 100 and 450.

67. The method of claim 66, wherein the mixture includes an isocyanurate catalyst that catalyzes a polymerization of excess isocyanate to form the isocyanurate compound.

68. The method of claim 67, wherein the isocyanurate catalyst is mixed into the mixture in a quantity of 0–2% of the total weight of the coating.

69. The method of claim 61, where applying the coating to the building product includes spraying at least one layer of the coating onto the building product.

70. The method of claim 69, where spraying at least one layer of the coating onto the building product includes spraying a plurality of layers of the coating onto the building product.

71. The method of claim 61, further comprising applying a layer of an insulating material onto the layer of the coating to insulate the coating when the coating is exposed to fire.

72. The method of claim 71, wherein applying a layer of an insulating material onto the layer of the coating includes applying a layer of alumina trihydrate onto the layer of coating.

73. The method of claim 61, wherein applying the coating to the member includes applying at least one layer of the polymeric binder to the member, and then applying at least one layer containing both the intumescent compound and the blowing agent onto the layer of the polymeric binder.

74. The method of claim 73, further comprising applying a layer of an insulating material onto the layer containing both the intumescent compound and the blowing agent to insulate the coating when the coating is exposed to fire.

75. The method of claim 73, the polymeric binder including a substantially liquid uncured state and a substantially solid cured state, wherein applying the polymeric binder to the member includes spraying a spray of the polymeric binder in the uncured state onto the member.

76. The method of claim 75, wherein applying the layer containing both the intumescent compound and the blowing agent includes mixing the intumescent compound and the blowing agent together into a dry mixture and applying the dry mixture to the layer of the polymeric binder with a hopper.

77. The method of claim 76, wherein applying the dry mixture to the layer of polymeric binder with a hopper includes passing the dry mixture through a sieve before applying the dry mixture to the layer of polymeric binder.

78. The method of claim 76, wherein spraying the spray of the polymeric binder onto the member includes moving the member in a continuous manner beneath a sprayer that sprays the polymeric binder onto the member, and wherein applying the dry mixture to the layer of polymeric binder includes moving the member with the layer of polymeric binder underneath the hopper in a continuous manner and dispensing the dry mixture onto the layer of polymeric binder.

79. The method of claim 78, further comprising moving the member in a continuous manner beneath an array of alternating sprayers and hoppers to alternately apply layers of the polymeric binder and layers of the dry mixture to the member.

80. A flame-retardant intumescent coating for a wood-based building product, the coating being adapted to expand to form an expanded coating when exposed to heat from a fire, the coating comprising:

a polymeric binder;

at least one blowing agent dispersed in the binder, wherein the blowing agent is adapted to expand the coating when the coating is exposed to heat from a fire; and at least one intumescent compound dispersed in the binder, wherein the polymeric binder is formed from a mixture including castor oil and an isocyanate, wherein the castor oil is present in the mixture in a quantity of 9–36% of the total weight of the coating, and wherein the binder includes an isocyanurate.

81. A flame-retardant intumescent coating for a wood-based building product, the coating being adapted to expand to form an expanded coating when exposed to heat from a fire, the coating comprising:

a polymeric binder;

at least one blowing agent dispersed in the binder, wherein the blowing agent is adapted to expand the coating when the coating is exposed to heat from a fire; and at least one intumescent compound dispersed in the binder, wherein the polymeric binder is formed from a mixture including castor oil, an isocyanate and an isocyanurate catalyst, wherein the castor oil is present in the mixture in a quantity of 9–36% of the total weight of the coating, and wherein the isocyanate is added in a stoichiometric excess so that the isocyanurate catalyst causes the formation of an isocyanurate from the excess isocyanate.

* * * * *